(12) United States Patent
Smith

(10) Patent No.: US 6,389,044 B1
(45) Date of Patent: May 14, 2002

(54) MULTI-WAVELENGTH LASER USABLE FOR WDM APPLICATIONS AND INTERFEROMETRIC SENSORS

(75) Inventor: James A. Smith, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/583,242

(22) Filed: May 31, 2000

Related U.S. Application Data

(60) Provisional application No. 60/142,208, filed on Jul. 2, 1999.

(51) Int. Cl.$^7$ ............................................. H01S 3/082
(52) U.S. Cl. .......................................... 372/23; 372/97
(58) Field of Search ................................ 372/23, 97, 6, 372/20

(56) References Cited

U.S. PATENT DOCUMENTS

| | | | |
|---|---|---|---|
| 4,928,527 A | | 5/1990 | Burger et al. .................. 73/657 |
| 5,414,540 A | * | 5/1995 | Patel et al. .................... 359/39 |
| 5,524,118 A | * | 6/1996 | Kim et al. ...................... 372/6 |
| 5,537,244 A | * | 7/1996 | Fukushima et al. ......... 359/341 |
| 5,564,832 A | * | 10/1996 | Ball et al. .................... 374/161 |
| 5,608,826 A | | 3/1997 | Boord et al. .................. 385/37 |
| 5,631,736 A | * | 5/1997 | Thiel et al. ................. 356/349 |
| 5,691,989 A | * | 11/1997 | Rakuljic et al. ............... 372/20 |
| 5,793,508 A | * | 8/1998 | Meli ........................... 359/130 |
| 5,832,011 A | * | 11/1998 | Kashyap ....................... 372/23 |
| 5,835,517 A | | 11/1998 | Jayaraman et al. ............ 372/50 |
| 5,910,962 A | * | 6/1999 | Pan et al. ........................ 372/6 |
| 6,041,070 A | | 3/2000 | Koch et al. ..................... 372/6 |
| 6,061,369 A | | 5/2000 | Conradi .......................... 372/6 |
| 6,064,472 A | | 5/2000 | Drewling ................... 356/28.5 |
| 6,064,510 A | | 5/2000 | Gottlieb et al. ............. 359/308 |
| 6,064,682 A | | 5/2000 | Vickers ........................ 372/38 |
| 6,064,684 A | | 5/2000 | Yoon et al. ................... 372/94 |
| 6,064,783 A | | 5/2000 | Congdon et al. ............. 385/15 |

FOREIGN PATENT DOCUMENTS

| | | | |
|---|---|---|---|
| WO | WO 98/34306 | 8/1998 | ............. H01S/3/06 |

\* cited by examiner

*Primary Examiner*—Paul Ip
*Assistant Examiner*—Jeffrey Zahn
(74) *Attorney, Agent, or Firm*—Juliana Agon

(57) ABSTRACT

A multi-wavelength laser (10) includes an optical loop (20) having a single optical cavity that supports a plurality of longitudinal modes, wherein the optical loop has a common gain medium (25) to supply the necessary optical gain to provide for a plurality of lasing longitudinal modes at a plurality of lasing wavelengths. A wavelength selector (30) is insertable into the optical loop within the optical path for selecting at least one lasing longitudinal mode (35) from the plurality of longitudinal modes. Although not exclusively, the multi-wavelength laser (10) is usable for WDM interferometric sensing (240).

20 Claims, 7 Drawing Sheets

MULTI-WAVELENGTH LASER USABLE FOR WDM APPLICATIONS AND INTERFEROMETRIC SENSORS

CROSS-REFERENCE TO RELATED APPLICATIONS

This application is based upon U.S. Provisional Application Ser. No. 60/142,208, filed on Jul. 2, 1999, from which the benefit of priority pursuant to 35 USC §120 is hereby claimed, and the full content which is incorporated herein by references as though fully set forth.

BACKGROUND OF THE INVENTION

1. Field of the Invention

The present invention relates generally to lasers, particularly to multi-wavelength lasers and to Interferometric Sensors that are Wavelength Division Multiplexed and utilize multi-wavelength laser sources.

2. Technical Background

To handle the explosion for data capacity in telecommunication systems, system designs are using wavelength division multiplexing (WDM) to obtain more data capacity. Thus, more laser sources of higher quality are needed to build and characterize WDM systems. A significant and growing fraction of the total cost in WDM systems is due to laser sources. Currently each WDM channel requires its own laser source. For example, a telecommunication system which is being designed for eighty wavelengths operation will need eighty source lasers. Future systems will be requiring even more laser wavelengths as the systems expand. Large cost savings can be realized by developing cheaper laser sources. The telecommunication systems as well as the test and measurement systems for WDM systems will realize the cost savings due to cheaper laser sources.

One way to make laser sources cheaper is to exploit the natural characteristics of Erbium Doped Fibers (EDF). The wide bandwidth of the EDF gain profile provides an ideal gain medium to design a multi-wavelength laser. The longitudinal modes of the laser cavity, which lase simultaneously at multiple wavelengths, are formed by using standard telecommunication components such as gratings, fiber Bragg gratings, thin films, phasors, and liquid crystal devices. Erbium Doped Fiber Laser (EDFL) wavelengths can be easily added or dropped. It is desired that an improved EDFL will be able to provide the necessary laser wavelengths to cover the ITU grid or any desired subset.

The need for cheaper lasers transcends the telecommunication industry. As more efficient designs of complex systems involving engineering structures, adaptive structures and manufacturing processes evolve, the ultimate limits of the engineering materials used in the systems are being approached. The reduced margins of safety for the materials used in the design of the complex systems will require the use of sensing systems to measure displacements, strain and temperature at a number of critical locations. These measurements will allow the designs to maintain safety and reliability.

Traditional electronic based sensors such as strain gauges, thermocouples, and resistive displacement sensors work well for applications which require only a relatively small number of sensors. To build large sensing arrays from electrical based sensors, the designer would be required to use complex routing, elaborate harnessing and delicate switching schemes. The additional wiring and electronics would interfere with the functionality of the structure even if state of the art thin film or MEMS sensors are used.

Optical sensors can reduce the complexity and the amount of routing because the interferometric sensors are non-contacting and can be WDM. Therefore, the optical sensor does not need to be mounted to the test specimen. Since the interferometric sensors can be WDMed or otherwise multiplexed, a single transmission fiber can send/receive light to/from multiple transducers. The multi-wavelength laser provides for the efficient generation and transmission of the optical energy to interrogate the optical sensors.

SUMMARY OF THE INVENTION

One aspect of the present invention is the generation of a laser synthesizer. A multi-wavelength laser includes an optical loop having a plurality longitudinal modes and a wavelength selector insertable into the optical loop for selecting at least one particular longitudinal mode from the plurality of modes for synthesizing desired laser wavelengths.

In another aspect, the present invention includes a wavelength division multiplexor as the wavelength selector.

Yet another aspect of the present invention is the construction of WDM interferometric sensors which efficiently utilize the multi-wavelength laser source.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
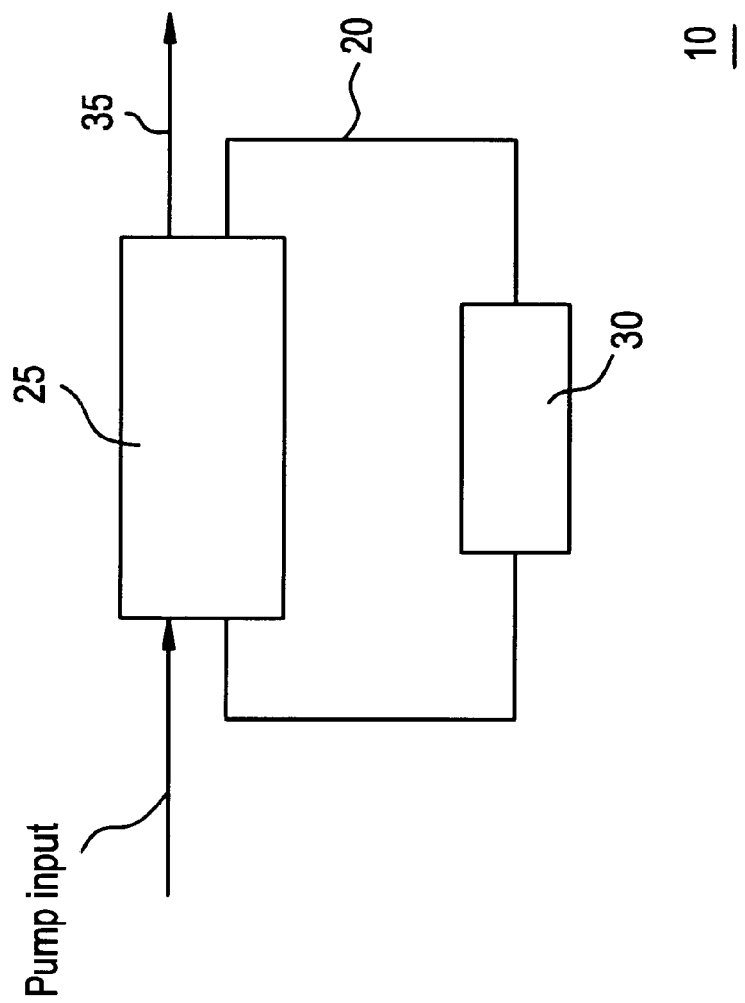
FIG. 1 is a block diagram of a multi-wavelength laser in accordance to the teachings of the present invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the multi-wavelength laser of the present invention is shown in FIG. 1, and is designated generally throughout by reference numeral 10.

Referring to FIG. 1, a multi-wavelength laser 10 includes an optical gain medium 25, an optical loop 20 having a plurality of longitudinal modes, and a wavelength selector 30 that is insertable into the optical loop 20 for selecting at least one longitudinal mode 35 from the plurality modes for synthesizing desired laser wavelengths.

Figure 3:
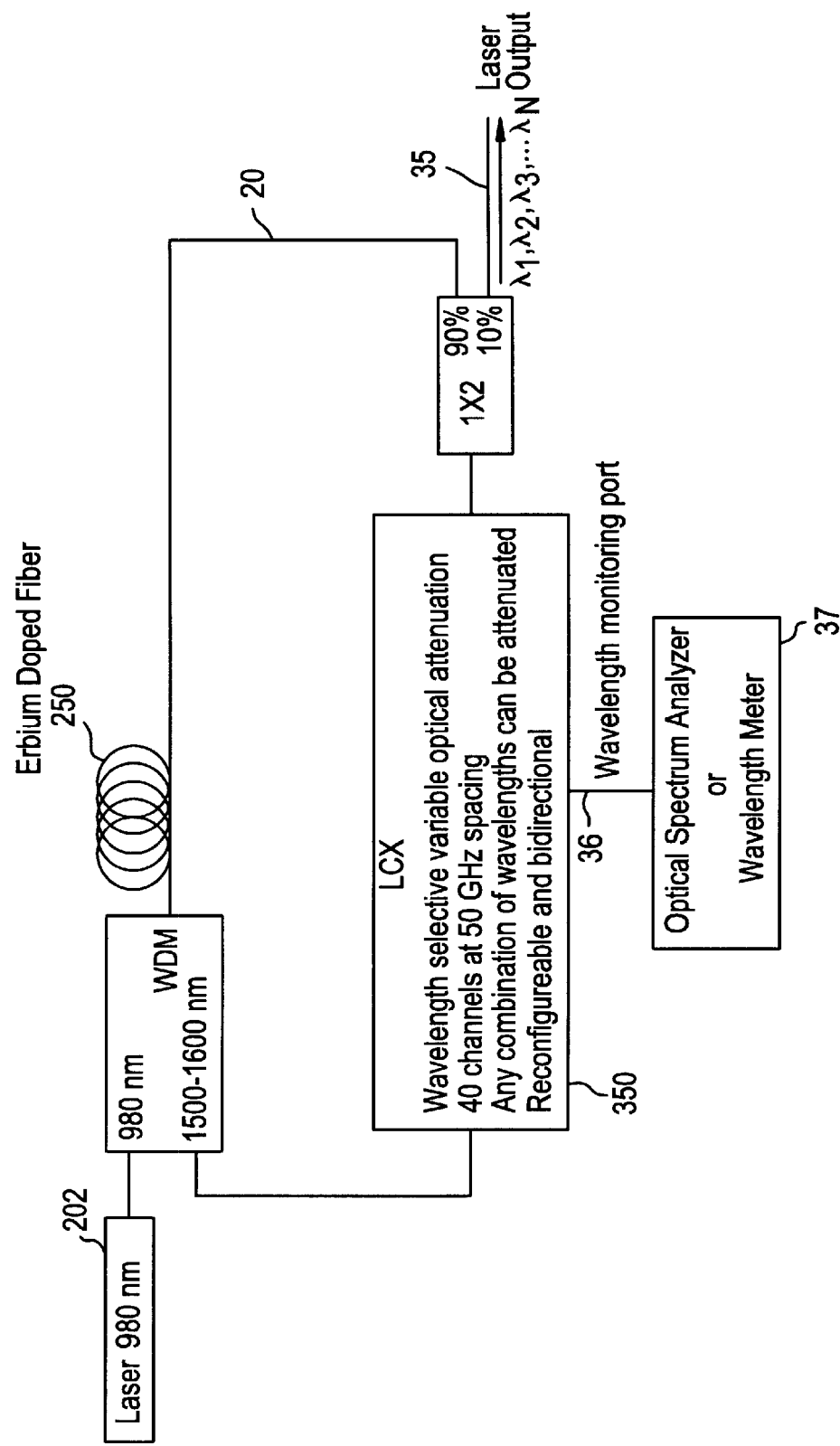
FIG. 3 is a block diagram of the multi-wavelength laser 10 of FIG. 1, wherein the optical loop 20 is a ring laser cavity and the wavelength selector 30 is a liquid crystal cross-connect (LCX) in accordance to the teachings of the present invention.
Figure 4:
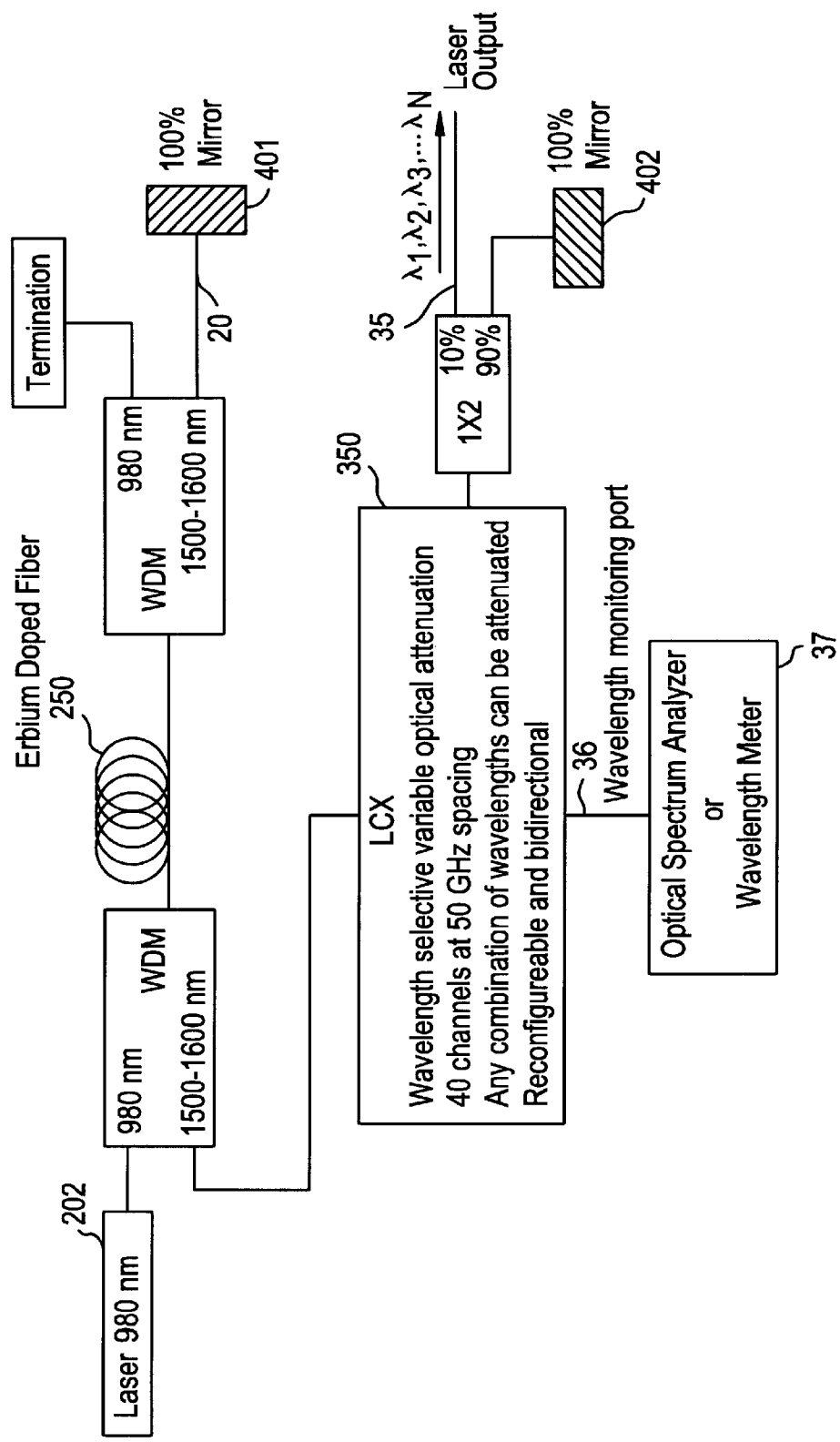
FIG. 4 is a block diagram of the multi-wavelength laser 10 of FIG. 1, wherein the optical loop 20 is a Fabry-Perot laser cavity and the wavelength selector 30 is a liquid crystal cross-connect (LCX) in accordance to the teachings of the present invention.

Referring to FIG. 1, the present embodiments of the multi-channel EDFLs use two different classes of optical loops 20 of FIG. 1: First, the Fabry-Perot of FIGS. 2 and 4; Second, the Ring Laser of FIG. 3, but other laser cavity classes are usable in accordance with the teachings of the present invention. Within each cavity class, multiple optical paths are formed in the WDM 223 of FIG. 2 or in the Liquid Crystal Cross-connect (LCX) 350 of FIG. 3, as provided by the LCX taught in U.S. Pat. No. 5,414,540. The functionality of the LCX 350, or other switches or wavelength selectors 30 of FIG. 1, provides for a convenient way to dynamically change the gain spectrum of the optical loop 20. Thus the lasing amplitude and wavelengths 35 of FIG. 1 can be externally controlled by the LCX 350 of FIG. 3 or by the combination of wavelength control by a wavelength division multiplexor 223 and amplitude control by the variable optical attenuator (VOA) 260 in FIG. 2. Hence, the LCX 350 of FIGS. 3–4 provides for dynamic wavelength selection, multiple lasing wavelengths, and optical power equalization/distribution amongst the lasing wavelengths in the EDFL. The intracavity wavelengths can be monitored by an Optical Spectrum Analyzer or by a Wavelength meter 37 from a monitoring port 36 in the LCX 350.

Because the present invention provides multiple wavelengths, there must be multiple longitudinal modes which can be considered to be uncoupled optical cavities. However component-wise, the cavities share one gain medium, share at least one mirror in a FP configuration of FIG. 2 or FIG. 4, (Ring lasers such as FIG. 3 do not have mirrors), and a majority of the optical path. Depending on the configuration it is the wavelength selector, such as a WDM device which provides for the controlled definition of the longitudinal modes. Hence, a multi-wavelength laser which can simultaneously emit multiple wavelengths is provided whose multiple wavelengths are dynamically controlled, selected or tuned by the wavelength selector. Advantageously, a reduced component count results with such a physical cavity, as taught by the present invention.

Figure 2:
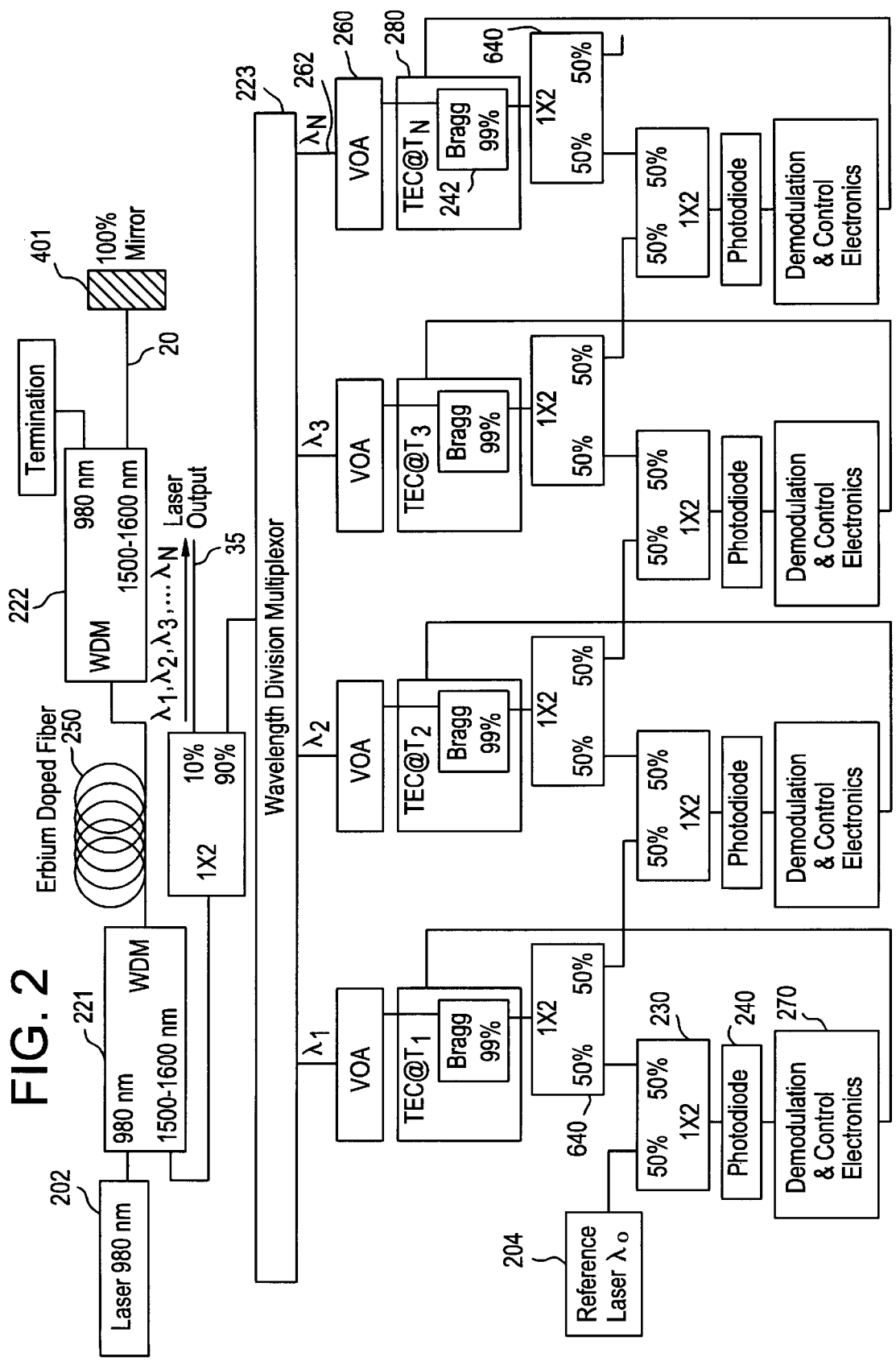
FIG. 2 is a block diagram of the multi-wavelength laser 10 of FIG. 1, wherein the optical loop 20 is a Fabry-Perot (FP) laser cavity and the wavelength selector 30 is a wavelength division multiplexor (WDM) in accordance to the teachings of the present invention.

Pumping a single gain medium 25 of FIG. 1 in the preferred form of an erbium doped fiber (EDF) 250 of FIG. 2 with a 980 nm laser source 202 provides the active gain medium. The first WDM 221 combines the optical pump energy with optical signal energy in the 1550 nm telecommunication band. The 980 nm pump light activates the EDF to provide gain for the optical energy in the 1550 nm band.

The second WDM 222 separates the excess 980 nm pump energy from the signal energy at 1550 nm. The WDMs 221 and 222 ensure that the pump laser light does not form an optical loop.

In the ring laser cavity of FIG. 3, the gain spectrum of the EDF 250 and the continuity of the optical electromagnetic fields within the ring cavity 20 determine the potential lasing wavelengths 35. The continuity requirement determines a set of discrete wavelengths that may resonate in the cavity 20 and the EDF gain spectrum determines which resonant wavelengths will have the potential to lase.

Figure 5:
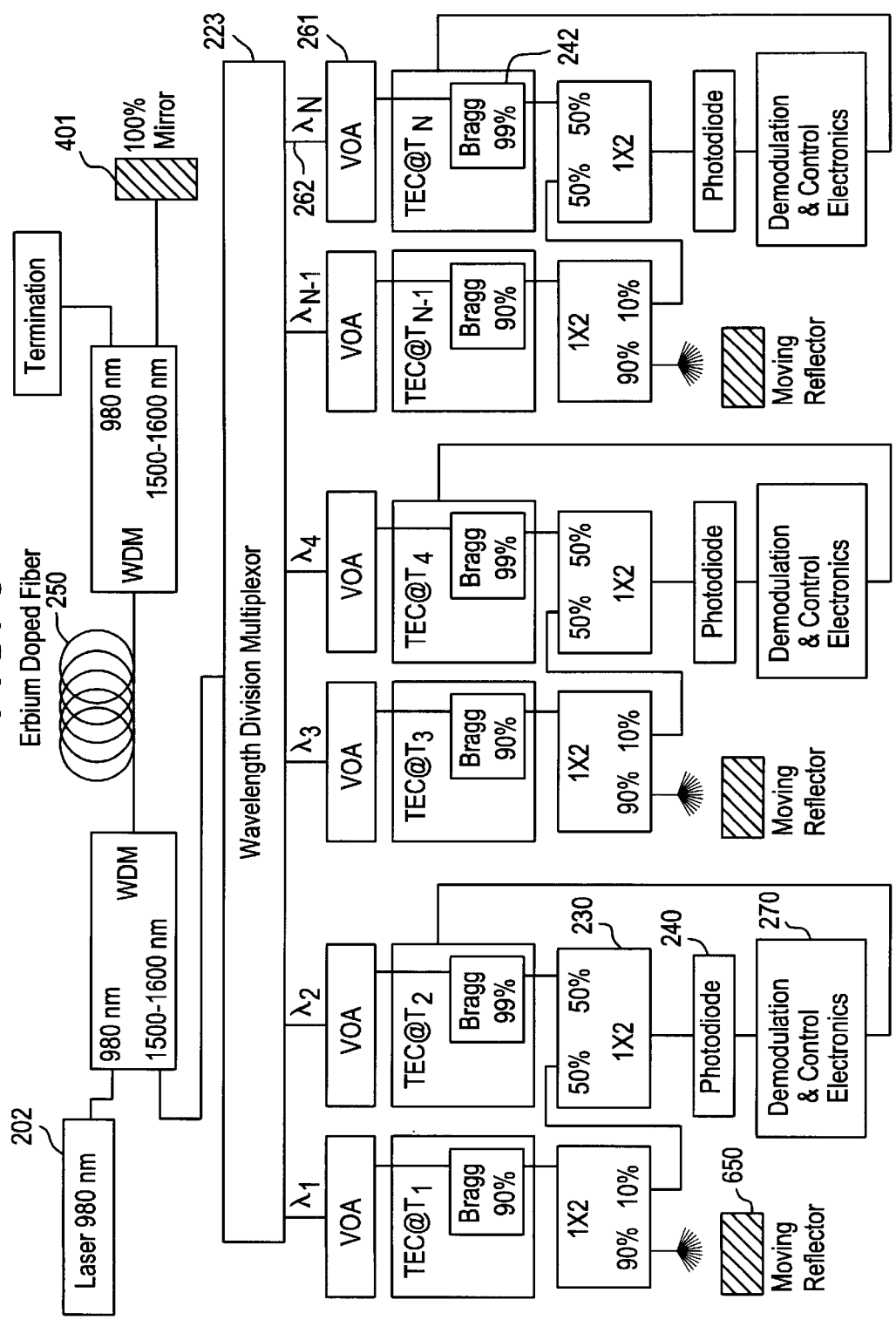
FIG. 5 is a block diagram of the multi-wavelength laser 10 of FIG. 2 used in an optical injection locked sensing system in accordance to the teachings of the present invention.

The Fabry-Perot cavity 20 of FIGS. 2, 4, and 5 operates in a similar manner except that the continuity requirement is supplemented by boundary conditions at the two ends such as mirrors 401 and 402 of FIG. 4. Thus the Faby-Perot cavity 20 of FIG. 4 specifies the resonant wavelengths and the gain medium determines the wavelengths 35 that lase.

Instead of using the second mirror 402 of FIG. 4, the third wavelength division multiplexor (WDM) 223, at least one Variable Optical Attenuator (VOA) 260 and at least one Bragg grating 242 can be substituted in its place in FIG. 2 which will also remove the need for the LCX 350.

FIG. 2 shows the schematic of such a multi-channel EDFL. Multiple optical paths are formed between the 100% mirror 401 and the reflective Bragg gratings 242. As before, an active gain medium is provided by pumping the EDF 250 with a 980 nm laser source 202. The third WDM 223 apportions the gain spectrum of the EDF 250 into separate optical paths. As stated previously, the Variable Optical Attenuator (VOA) 260 provides amplitude control for the individual laser wavelengths 262. The reflective Bragg gratings 242 determine the laser linewidth and center wavelength. The center wavelength can be tuned by changing the ambient temperature of the Bragg gratings 242, which changes the optical path length of each sub-cavity.

To actively stabilize/tune the laser wavelengths, a heterodyne interferometer is optionally used to monitor the leakage light transmitted through the Bragg grating 242. A stable reference laser 204 at a specified wavelength $\lambda_0$ is used to precisely determine the center wavelength of the first laser cavity at $\lambda_1$. Light from the reference laser 204 and the first EDFL cavity is mixed in a 1×2 mixing coupler 230. The mixed light from the coupler 230 is incident onto a photodiode 240. The photodiode 240 monitors the intensity fluctuations of the mixed light. The mixed light intensity is amplitude modulated at the frequency difference between $\lambda_0$ and $\lambda_1$. The control electronics 270 keep a specified frequency difference (wavelength) constant by adjusting the temperature of the fiber Bragg grating 242 through the use of a Thermoelectric Controller (TEC) 280. Once $\lambda_1$ is established, $\lambda_1$ is used to set $\lambda_2$ and $\lambda_2$ is used to set $\lambda_3$. This process is cascaded to accurately establish the center wavelengths $\lambda_1$ through $\lambda_N$ with respect to the reference wavelength to create a laser synthesizer or wavelength standard or generator. The last N-coupler 640 would not be necessary at the end of the cascaded chain where no more wavelengths are needed. However, the open port at the last N-coupler 640 allows the flexibility of adding more wavelengths if desired.

By applying WDM interferometric sensors and the multi-wavelength laser source to mechanical sensing problems, in accordance with the teachings of the present invention, a broad range of inventive robust sensing systems can be developed. Novel multi-channel interferometers can be developed using telecommunication components such as fiber Bragg gratings and thin film devices. These interferometers can be used for non-contacting displacement, strain and temperature measurements, such as for non-evasively monitoring the acoustic resonances at critical points of mechanical structures.

Figure 6:
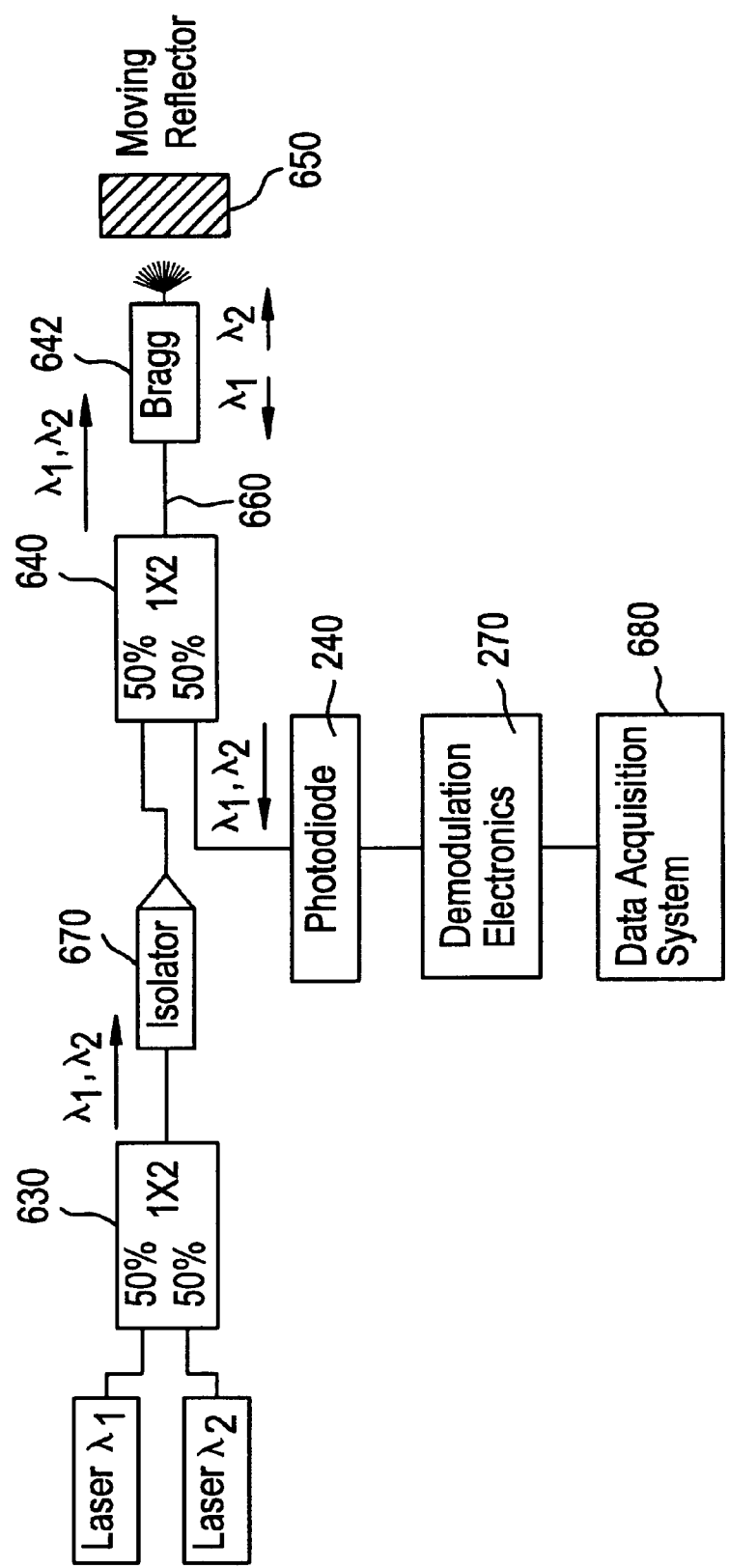
FIG. 6 is a Bragg fiber tip portion of an interferometric sensing system in accordance to the teachings of the present invention.

The basic building blocks of the WDM displacement sensor that can be incorporated into an array is shown in FIG. 6. The optical sensor will be a heterodyne interferometer that uses a Bragg Fiber Tip (BFT) 642. Two closely spaced wavelengths are injected into a first 1×2 coupler 630 with a fiber Bragg grating 642 at the end of the sensing leg of a second coupler 640. One of the wavelengths ($\lambda_1$) is reflected by the grating 642 and the other wavelength ($\lambda_2$) exits the grating end of the fiber 660 onto the surface of the test specimen, represented by a moving reflector 650. Some of the light, which exits the fiber 660, is scattered back into the fiber 660. Both wavelengths of light travel back through the second 1×2 coupler 640 and are evenly split into the two legs of the coupler 640. The backreflected light that is guided to the isolator 670 is absorbed. The backreflected light ($\lambda_1$, $\lambda_2$) that propagates to the photodiode 240 is incident and mixed onto the photodiode 240.

The photodiode 240 monitors the intensity fluctuations of the mixed light. The mixed light intensity is amplitude modulated at a carrier frequency, which is the frequency difference between $\lambda_1$ and $\lambda_2$. The movement of the test specimen frequency modulates the carrier frequency via the Doppler shift of $\lambda_2$. The test specimen also phase modulates the carrier via changes in displacements which is equivalent to the Doppler shift. The modulated carrier signal is either frequency demodulated (velocity) or phase demodulated (displacement) by the systems electronics 270 to monitor the motion of the test specimen 650. The data acquisition system 680 records the displacement measurements in real-time and archives the data which is to be used to analyze the motion of the moving reflector.

Since both wavelengths travel within the same fiber 660 over the majority of the optical paths, the interferometric configuration is robust with respect to optical path length changes due to temperature, vibration and acoustics. These noise sources should have minimal effect on the measurements made by the interferometer of FIG. 6. Thus this sensing configuration will be easier to implement in the manufacturing environment than conventional interferometers.

Figure 7:
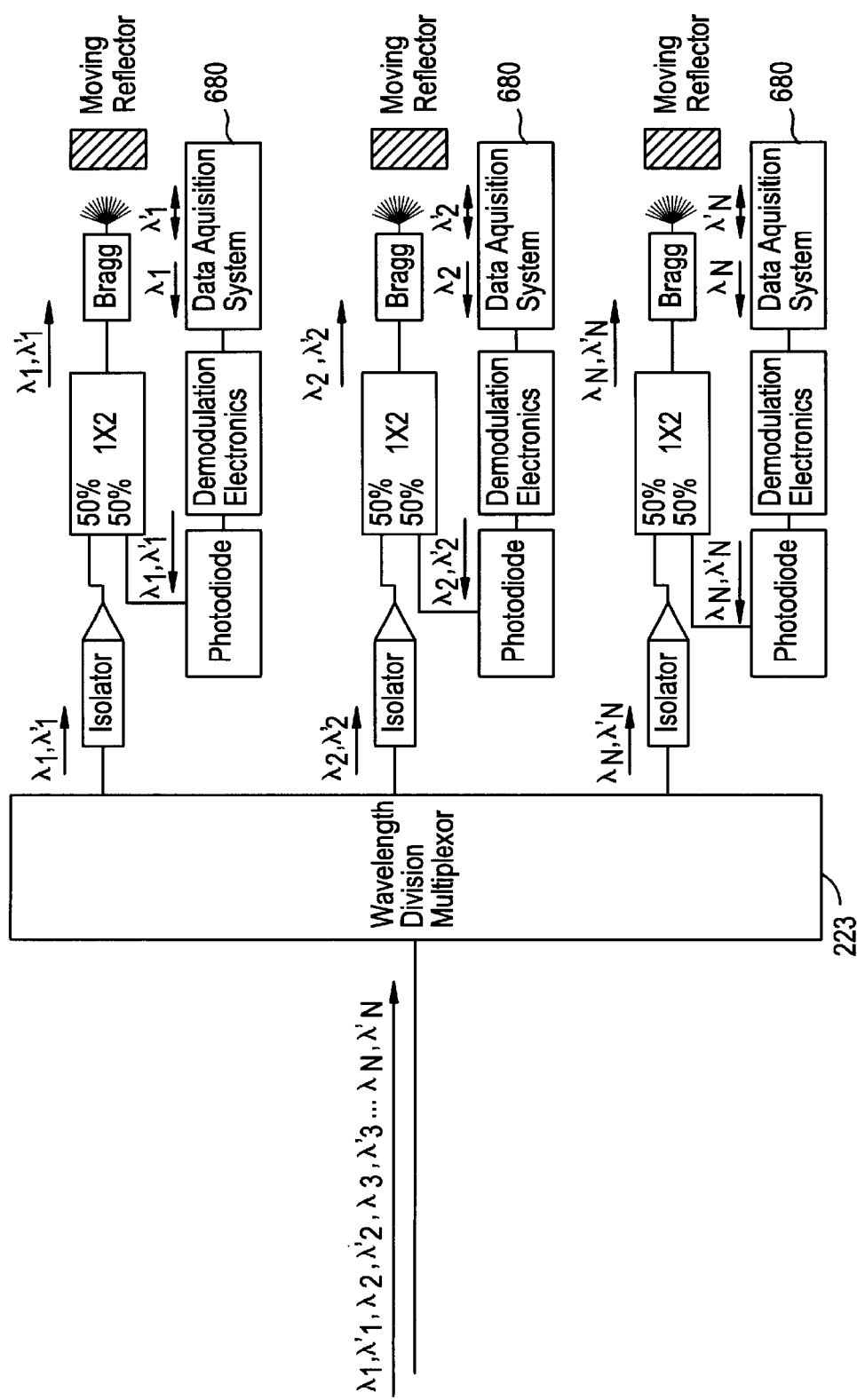
FIG. 7 is a sensing system which consists of heterodyne interferometers that are wavelength division multiplexed, using multiple Bragg fiber tip portions of FIG. 6, in accordance to the teachings of the present invention.

Several heterodyne interferometers using Bragg fiber tips can be efficiently combined to create an array of sensors, such as in FIG. 7. Multiple pairs of closely spaced wavelengths (i.e. $\lambda_1$, $\lambda'_1$) are routed to individual interferometers by the wavelength division multiplexor (WDM) 223. The resulting sensor array is capable of providing displacements at discrete locations. This displacement information can then be used in modal analysis to determine the quality or health of a mechanical structure. The design shown in FIG. 7 allows the multi-wavelength laser source to be in a central location and to service other applications.

The EDFL technology can be modified to incorporate the interferometer as part of the laser cavity. The schematic of an injection locked fiber laser with multiple channels for a heterodyne sensing system is shown in FIG. 5. This configuration reduces the alignment sensitivity of the component interferometers. The gain and single mode properties of the optical path 262 amplify and mode filters the backscattered light from the moving reflector. Thus dynamic and inefficient coupling of backscattered light into the optical path within the laser can be tolerated.

Referring to FIG. 5, the multiple laser cavities 262 are formed between the 100% mirror 401 and the reflective Bragg gratings 242. Pumping the EDF 250 with a 980 nm laser source 202 provides an active gain medium as before in FIG. 2. The WDM 223 apportions the gain spectrum of the EDF 250 into separate optical paths 262. The Variable Optical Attenuator (VOA) 260 provides amplitude control for the individual laser wavelengths. The reflective Bragg gratings 242 determine the laser linewidth and center wavelength of each of the individual laser wavelengths. The center wavelengths can be tuned by changing the ambient temperature of the Bragg gratings 242, which changes the optical path length.

A heterodyne interferometer is formed between two adjacent cavities. Referring back to FIG. 5, the laser light is tapped out of the odd numbered sub-cavities after the light has been transmitted through the Bragg gratings 242. The interrogating laser at a nominal wavelength, $\lambda_1$, is used to measure the surface motion of the object under test, as represented by the moving reflector 650. Light from the reference laser, $\lambda_2$, and the interrogating laser is mixed in a 1×2 coupler 230. The mixed light from the coupler 230 is incident onto a photodiode 240. The photodiode 240 produces a carrier signal at the frequency difference between $\lambda_1$ and $\lambda_2$. The control electronics 270 keeps the nominal carrier frequency constant by adjusting the temperature of the fiber Bragg grating 242 through the use of a Thermoelectric Controller (TEC) 280.

Some of the light $\lambda_1$ that is exiting the interrogating fiber is scattered back into the fiber. This recaptured light reenters the laser cavity and perturbs the operating point of the cavity. The cavity perturbation can be monitored by an amplitude (self-mixing) or a frequency (phase locking) effect. The heterodyne interferometer monitors the frequency perturbations which are a function of the object's motion. Thus a sensitive and robust displacement sensor is constructed.

Reference is made to U.S. Pat. No. 4,928,527 for a more detailed explanation of optical interfermetric sensing measurements where a grating fiber end was not taught, as in the present invention.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method for laser synthesizing a plurality of different wavelengths, the method comprising the steps of:
   providing a laser having a common gain medium in a resonant path for receiving and exiting a pump energy and having a continuity between a plurality of reflectors having a common reflector for supporting a plurality of optical wavelengths pumped by the pump energy that share the common reflector
   selecting at least one optical wavelength from the plurality of optical wavelengths between one of the plurality of reflectors and the common reflector; and
   referencing said at least one optical wavelength to an internal or external reference source.

2. A method of claim 1 wherein the step of referencing includes optical interferometric sensing for the measurement of dynamic displacements.

3. A multi-wavelength laser comprising:
   a resonant path that receives and exits a pump energy and having a continuity between a plurality of reflectors for resonating a plurality of longitudinal modes for multiple lasing oscillations, wherein the resonant path has a common reflector out of the plurality of reflectors and a common gain medium to supply the necessary optical gain and pump energy to provide for a plurality of lasing longitudinal modes at a plurality of lasing wavelengths that share the common reflector; and a wavelength selector that is insertable into the resonant path between one of the plurality of reflectors and the common reflector for selecting at least one lasing longitudinal mode from the plurality of longitudinal modes.

4. The multi-wavelength laser of claim 3 wherein the resonant path comprises a Fabry-Perot laser cavity having an erbium doped fiber as the common gain medium for supporting broadband wavelength amplification of the plurality of lasing wavelengths between the plurality of reflectors, comprising at least one of the group comprising a grating and a mirror.

5. The multi-wavelength laser of claim 3 wherein the resonant path comprises a ring laser cavity having an erbium doped fiber as the common gain medium between the plurality of reflectors formed by an optical continuity requirement of optical electromagnetic fields within the ring laser cavity.

6. The multi-wavelength laser of claim 3, wherein the wavelength selector comprises a WDM to select at least one desired lasing wavelength from the plurality of lasing longitudinal modes.

7. The multi-wavelength laser of claim 6, wherein the wavelength selector further comprises a VOA to control the amplitude of at least one desired lasing wavelength from the plurality of lasing longitudinal modes.

8. The multi-wavelength laser of claim 3, wherein the wavelength selector comprises an LCX to control the desired lasing wavelengths and amplitudes from the plurality of longitudinal modes.

9. A multi-wavelength laser comprising:

a resonant path bounded by a plurality of reflectors that supports a plurality of longitudinal modes for multiple lasing oscillations, wherein the resonant path has a common reflector out of the plurality of reflectors and a common gain spectrum to supply the necessary optical gain to provide for a plurality of lasing longitudinal modes at a plurality of lasing wavelengths that share the common reflector;

a combiner having an output port, a first input port and a second input port, wherein the first input port receives a pump energy, the output port is coupled to the common reflector for forming a first end of the common gain medium of the resonant path, and the second input port is coupled into another portion of the resonant path for the combiner to combine the pump energy with the plurality of lasing longitudinal modes and each mode being capable of lasing at a respective lasing wavelength when pumped by the pump energy, whereby lasing light is emittable from respective each one of the lasing longitudinal modes;

a wavelength selector that is insertable into the resonant path between one of the plurality of reflectors and the common reflector for selecting at least one lasing longitudinal mode from the plurality of longitudinal modes; and a wavelength separator coupled to another one of the plurality of reflectors to form a second end of the common gain medium for providing a first port outside of the resonant path and a second port for the plurality of longitudinal modes to loop back into the resonant path.

10. The multi-wavelength laser of claim 9, wherein the combiner comprises a first wavelength division multiplexor (WDM).

11. The multi-wavelength laser of claim 10, wherein the resonant path comprises a Fabry-Perot laser cavity having a plurality of sub-cavities, apportioned upon the common gain spectrum by the wavelength selector, between the common reflector comprising a mirror and the plurality of reflectors comprising reflective Bragg gratings.

12. The multi-wavelength laser of claim 11, wherein the wavelength selector comprises.

a second WDM for apportioning the gain spectrum of the common gain spectrum into the plurality of sub-cavities;

a plurality of Variable Optical Attenuators (VOAs) each disposed in at least one of the plurality of sub-cavities for providing amplitude control for the respective lasing wavelengths;

the plurality of reflective Bragg gratings disposed at the end of each of the plurality of sub-cavities for determining the laser linewidth and center wavelength of the respective lasing wavelengths; and a plurality of Thermoelectric Controllers (TECs) for adjusting the temperature of the plurality of reflective Bragg gratings for changing the optical path length of each of the sub-cavities for determining the center wavelength of the respective lasing wavelength.

13. The multi-wavelength laser of claim 12 further comprising a heterodyne interferometer for actively tuning the respective laser wavelengths based on the feedback received from monitoring the leakage light transmitted through each of the plurality of reflective Bragg gratings.

14. The multi-wavelength laser of claim 13 wherein the heterodyne interferometer comprises:

a reference laser emitting at a specified wavelength $\lambda_0$ for precisely determining the center wavelength of the first sub-cavity at $\lambda_1$;

a mixing coupler for mixing light from the reference laser and the first sub-cavity for providing a mixed light output;

a photodiode monitors the intensity fluctuations of the mixed light output from the mixing coupler;

a demodulation controller for amplitude modulating the intensity fluctuations of the mixed light output for providing a frequency difference between $\lambda_0$ and $\lambda_1$ and stabilizing the frequency difference at a predetermined constant by adjusting the temperature of the respective TEC associated with the respective reflective Bragg grating for tuning the center wavelength of the first sub-cavity at $\lambda_1$; and a plurality of cascading couplers and a plurality of duplicated sets comprising the photodiode and the demodulation controller for tuning the center wavelength of a sub-cavity with reference to a previous tuned sub-cavity.

15. The multi-wavelength laser of claim 11, wherein the resonant path further comprising an output coupler having a first input port, a first output port and a second output port, the first output port providing an exit path for the multi-wavelength laser output having the plurality of lasing wavelengths and the second output port coupling back to the first input port providing a loop back into the resonant path.

16. The multi-wavelength laser of claim 12, wherein the wavelength separator comprises a third WDM having the first port terminated for proving an exit path for the pump energy and the second port coupled to the mirror for the plurality of longitudinal modes to loop back into the Fabry-Perot laser cavity.

17. The multi-wavelength laser of claim 9, wherein the wavelength separator comprises an output coupler having a coupling port, the first port outside of the resonant path, and the second port, wherein the first port disposed outside of the resonant path provides an exit path for the multi-wavelength laser output having the plurality of lasing wavelengths and the second port coupling back to the coupling port provides for the plurality of longitudinal modes to loop back into the resonant path.

18. The multi-wavelength laser of claim 17, wherein the wavelength selector comprises an LCX coupled to the coupling port of the output coupler to control the plurality of lasing wavelengths and amplitudes of the multi-wavelength laser output.

19. The multi-wavelength laser of claim 10, wherein the resonant path comprises a Fabry-Perot laser cavity having a plurality of sub-cavities, apportioned upon the common gain spectrum by the wavelength selector, between the common reflector comprising a first mirror and another one of the plurality of reflectors comprising a second mirror.

20. The multi-wavelength laser of claim 19, wherein the wavelength selector comprises:

an output coupler having a coupling port, the first port outside of the resonant path, and the second port, wherein the first port disposed outside of the resonant path provides an exit path for the multi-wavelength laser output having the plurality of lasing wavelengths and the second port coupling back to the coupling port provides for the plurality of longitudinal modes to loop back into the Fabry-Perot laser cavity; and an LCX coupled to the coupling port of the output coupler to control the plurality of lasing wavelengths and amplitudes of the multi-wavelength laser output.

* * * * *